United States Patent [19]

Whitney et al.

[11] 4,176,413

[45] Dec. 4, 1979

[54] UNITARY, INTEGRAL PLASTIC TANK AND RIM FOR A TOILET, AND METHOD FOR MAKING SAME

[75] Inventors: Thomas M. Whitney, Lapeer; Samuel C. Crosby, Ann Arbor, both of Mich.

[73] Assignee: Trayco, Inc., Lapeer, Mich.

[21] Appl. No.: 914,315

[22] Filed: Jun. 12, 1978

Related U.S. Application Data

[62] Division of Ser. No. 801,506, May 31, 1977, abandoned.

[51] Int. Cl.² .................. E03D 1/24; B29C 17/07; B29C 17/10
[52] U.S. Cl. .................................. 4/300; 4/329; 4/353; 264/520; 264/536; 264/541; 425/525
[58] Field of Search .................. 264/89, 94, 96-99, 264/520, 521, 536, 540-543; 425/525; 4/300, 329, 350, 353

[56] References Cited

U.S. PATENT DOCUMENTS

| 3,120,679 | 2/1964 | Price et al. .............................. 264/98 |
| 3,263,009 | 7/1966 | Vidal ...................................... 264/98 |
| 3,452,125 | 6/1969 | Shurman et al. ........................ 264/89 |
| 3,564,087 | 2/1971 | Ruekberg ............................... 264/89 |
| 3,591,868 | 7/1971 | Owens ..................................... 4/300 |
| 3,792,143 | 2/1974 | Branscum et al. .................. 264/89 X |
| 3,939,500 | 2/1976 | Miller et al. ............................ 4/332 |
| 4,070,430 | 1/1978 | Confer ................................... 264/98 |

FOREIGN PATENT DOCUMENTS

| 730607 | 3/1966 | Canada ....................................... 264/98 |
| 1178197 | 9/1964 | Fed. Rep. of Germany ............. 264/98 |
| 2323035 | 11/1974 | Fed. Rep. of Germany ............. 264/94 |
| 51-91967 | 12/1976 | Japan ......................................... 264/94 |

Primary Examiner—Jan H. Silbaugh
Attorney, Agent, or Firm—Cullen, Sloman, Cantor, Grauer, Scott & Rutherford

[57] ABSTRACT

An integral, unitary plastic tank and rim flush for a toilet are disclosed, along with the apparatus and method of manufacture. The tank includes a bottom wall and sidewalls, one of which is integral with an essentially tubular water passageway. The rim includes an oval-shaped, hollow duct which is integral with the passageway and includes a plurality of spaced openings in a bottom wall surface to distribute water around the periphery of a toilet bowl. In the method of making the product, an elongated thermoplastic parison is positioned between a pair of blow mold sections. Next, the sections are closed, enclosing respective parison portions within a tank cavity, a passageway cavity and a rim cavity. Blow fluid under pressure is introduced into the parison portion within the tank cavity, resulting in the various cavity-enclosed parison portions being blown to their final shape. After cooling, the article is removed from the mold, trimmed and drilled to form the final product.

4 Claims, 12 Drawing Figures

UNITARY, INTEGRAL PLASTIC TANK AND RIM FOR A TOILET, AND METHOD FOR MAKING SAME

CROSS-REFERENCE TO RELATED APPLICATIONS

This is a division of application Ser. No. 801,506, filed May 31, 1977 now abandoned.

The subject matter of this invention may be used in combination with the disclosures of applications Ser. Nos. 761,731, now U.S. Pat. No. Des. 247,913, and 761,743, now U.S. Pat. No. 4,145,776, both filed Jan. 24, 1977 and incorporated by reference.

BACKGROUND OF THE INVENTION

1. Field of the Invention

The present invention relates generally to a tank and rim for a toilet, to the method of manufacture and to the molding apparatus. More specifically, the tank and rim are integral and unitary, are free of any joints, and are formed in a blow molding operation from a tubular plastic parison.

2. The Prior Art

Toilets have conventionally been made from ceramic or vitreous china in order to meet applicable codes which require several features, including the absence of joints and cracks, particularly in the bowl and trap to prevent harbors for bacteria growth. Because the bowls have been made of china, the tanks have likewise been made of the same material to form either an integral product or a product comprised of components made of the same materials. In the method of making these prior types of toilets, many components are individually made and then assembled together. The assembled components are then covered with a common material to fill the joints and placed back into a kiln for a second phase of firing. As a result, substantial manual labor is required in assembling the various components and then coating the assembly and substantial energy is required due to multiple passes through the kiln. Additionally, such toilets are not easily handled because of their weight and are subject to breakage during shipping and installation.

Accordingly, a long-felt need has existed for a practical replacement for the prior art toilet in order to overcome these and other recognized disadvantages and shortcomings.

SUMMARY OF THE INVENTION

The present invention overcomes these prior art problems in an integral, unitary tank and rim flush which is made of a plastic material, preferably in a blow molding operation.

The integral, unitary product includes a plastic water holding tank comprised of a bottom wall and integral, upstanding vertical sidewalls. A plastic rim includes a generally hollow, oval-shaped duct which includes a lower wall having a plurality of openings to distribute water to the upper peripheral region of a toilet bowl. Integrally interconnecting the tank and rim is an essentially tubular plastic passageway which communicates at its opposed ends with respective openings in a sidewall of the tank and the rim duct.

Preferably, the lower wall of the plastic rim duct gradually slopes downwardly from that portion of the rim which is connected to the passageway, in order to facilitate the distribution of water around the entire rim. Additionally, a reinforcing web of plastic material may integrally interconnect the tank and rim and extend laterally outwardly of the plastic passageway. This web may include integrally molded inserts to receive fastening means for securing a toilet seat. When the product is formed in a blow molding operation, the reinforcing web extends around the entire periphery of the rim to form a reinforcing flange which is essentially twice as thick as the sidewalls of the rim duct. This results from the flange having been formed by collapsing or pinching two plastic parison portions together, whereas the duct walls have been expanded during the blow molding operation.

The mold assembly for forming the integral tank and rim includes a pair of blow mold sections. Each of these sections include a first generally planar surface having a central, generally oval-shaped raised region circumscribed by a pinch line for blanking out an opening in the blown part. A separate depression circumscribes the pinch line for forming the rim flush. A second essentially planar surface on each of the mold sections is inclined with respect to the first planar surface for parallel registry and include a cavity for forming respective portions of the tank. An essentially semi-cylindrical indent in each of the mold sections extends between each respective tank cavity and rim flush depression to provide fluid flow communication during the blow molding operation.

In the method, a tubular parison is downwardly extruded between the pair of blow mold sections. Due to the weight of the parison and the fact that the upper portion is hotter from being most recently extruded, the parison thins out at the top. The blow mold sections are then closed on the parison such that the thicker, bottom portion is enclosed within a tank cavity, the top portion is enclosed within an oval-shaped rim cavity, and an intermediate portion is enclosed within the water passageway cavity interconnecting the rim and tank. Next, blow fluid under pressure is introduced into the parison portion within the tank and flows into the rim parison portion by way of the water passageway. During the blow molding operation, the parison portion within the rim cavity is expanded less than the parison portion within the tank cavity, so that the thinner parison portion is not unduly reduced in thickness.

Accordingly, the present invention relates to an integral, unitary tank and rim providing numerous advantages over the prior art. Specifically, the present invention provides a product which (1) is made of a plastic material, and as such is adapted for use with the invention of Ser. No. 761,743; (2) is relatively inexpensive in comparison with the prior art products; (3) is light and is therefore easy to handle and inexpensive to ship; (4) assists in achieving a reduced water consumption during toilet flushing; (5) is not easily damaged during shipping and installation; and (6) conserves energy due to the manufacturing method employed.

These and other meritorous features and advantages will be more fully appreciated from the following detailed description and the appended claims.

DETAILED DESCRIPTION OF THE PREFERRED EMBODIMENTS

Figure 1:
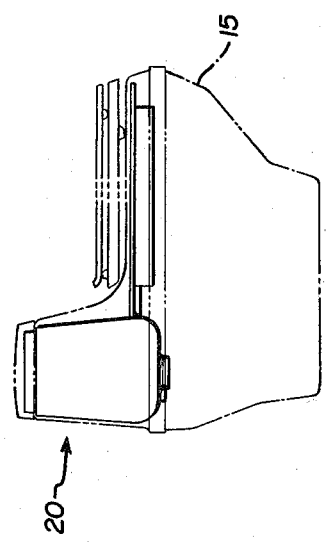
FIG. 1 illustrates the integral, unitary plastic tank and rim flush of the present invention as it may be positioned within a toilet shell or housing.

FIG. 1 illustrates the integral, unitary plastic tank and rim flush 20 as it may be positioned within an outer shell housing 15 of a toilet. Most preferably, although not necessarily, the component 20 may be used in combination with the shell unit disclosed in design patent application Ser. No. 761,731, filed Jan. 24, 1977 and in combination with a unitary, integral plastic bowl, trap and waterway disclosed in application Ser. No. 761,743, also filed Jan. 24, 1977. In general, the integral tank and rim are formed of a plastic material, preferably a thermoplastic material, and most preferably polypropylene. As described in greater detail in later portions of the disclosure, the invention is formed in a blow molding procedure to achieve a product which is free of any joints, including only pinch lines forming fused seams. The tank and rim may be held in position within the shell 15 as desired, preferably by spraying or injecting polyurethane foam into the shell.

Figure 2:
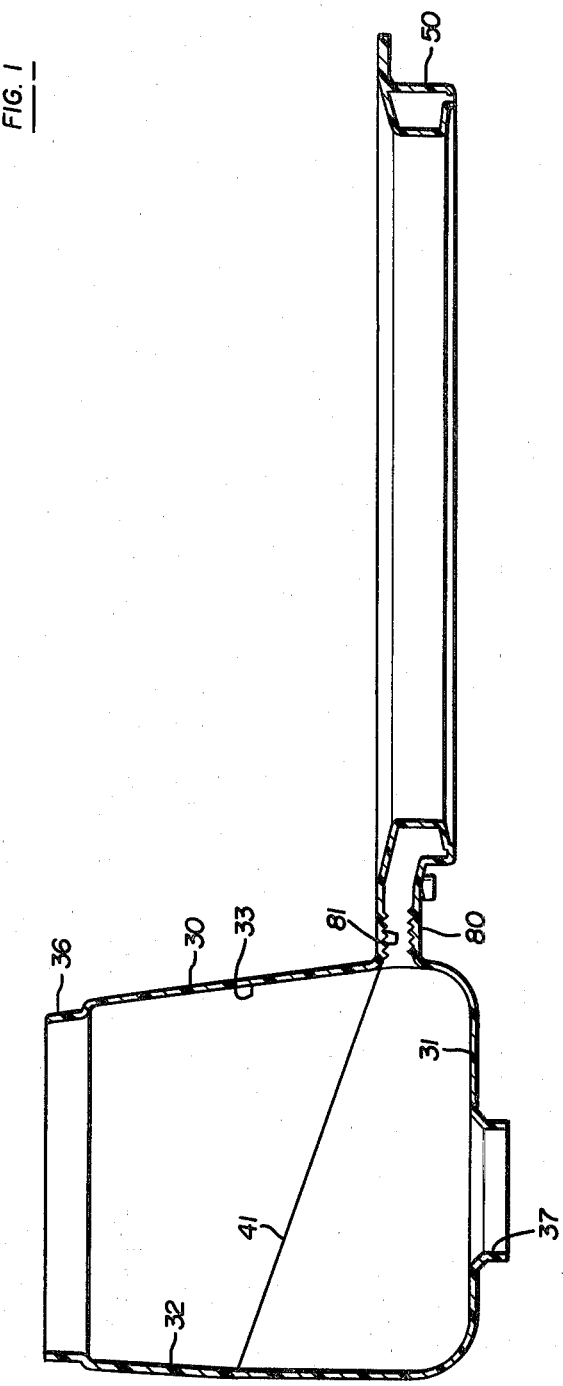
FIG. 2 is a cross-sectional illustration of the primary components of the present invention, taken along plane 2—2, as illustrated in FIG. 3.

The product of the present invention primarily comprises three basic components, a tank 30, a rim flush 50, and an integral water passageway 80, as illustrated in FIG. 2.

FIGS. 2 through 6 collectively illustrate that the tank includes a generally horizontal bottom wall 31, a pair of major upstanding sidewalls 32 and 33 and a pair of minor upstanding sidewalls 34 and 35, all of which are integral. An upper flange 36 extends around the top of the sidewalls and is adapted to fit within a grooved flange in the shell housing.

A water outlet flange 37 is centrally located in the bottom wall 31 of the tank and provides a passageway for delivering water to the waterway disclosed in Ser. No. 761,743. Most preferably, a separate adapter will couple the flange 37 to the waterway of the toilet bowl. A secondary flange 38, best illustrated in FIG. 5, extends downwardly from the tank floor 31 to provide a fitting for a ballcock. As shown, the flange includes an essentially cylindrical bottom portion which blends into an outwardly flaring member 39 which is integral with the floor by an annular rim 40.

As a result of the particular forming operation proposed by the present invention, the minor sidewalls 34 and 35 each include a fused seam line 41, as illustrated in FIG. 2. These fused seam lines are formed as pinch lines in the blow molding operation, but have experienced the same thermal history as the material forming the other portions of the product. As shown, the seam lines extend at an inclined angle relative to the horizontal on the order of about 20°.

Figure 6:
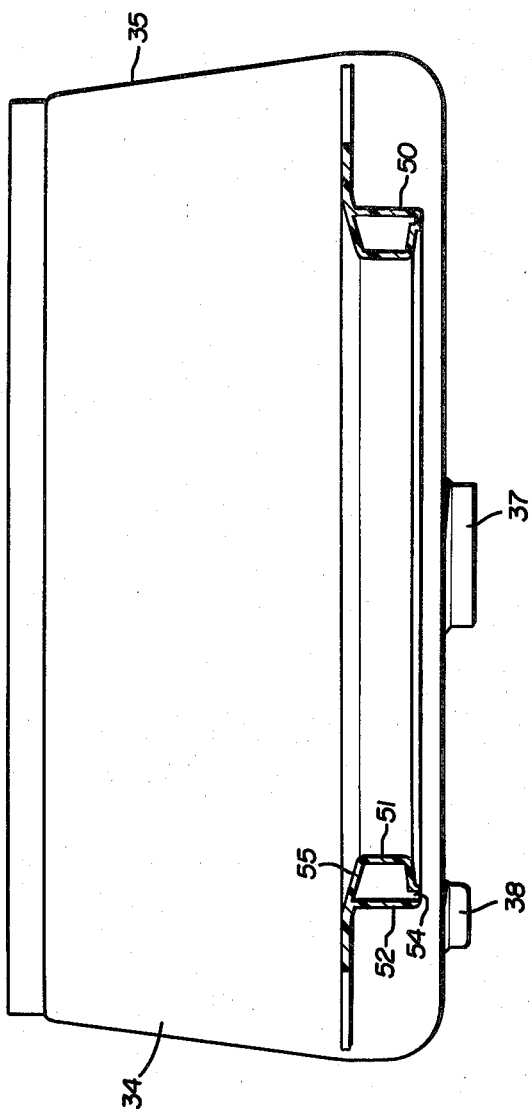
FIG. 6 is a cross-sectional view taken along plane 6—6 as shown in FIG. 3, illustrating the cross-section of the oval-shaped rim flush.
Figure 7:
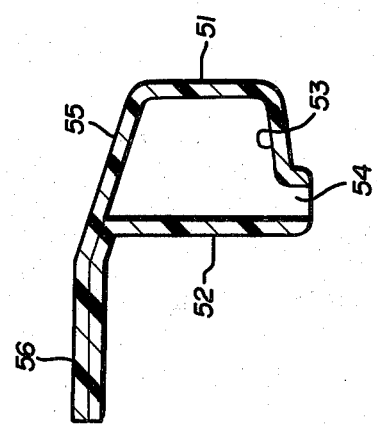
FIG. 7 is an enlarged illustration of the water-carrying duct of the rim flush.

Turning now more particularly to FIGS. 6 and 7, the rim flush includes an inner peripheral sidewall 51 over which a lip or flange of the shell 15 fits. An outer peripheral sidewall 52 is generally parallel to wall 51 and most preferably seats within the upper portion of a toilet bowl. An annular, oval-shaped bottom wall 53 slopes downwardly from the inner peripheral sidewall 51 and includes a plurality of spaced openings 54 which distribute water around the periphery of the toilet bowl to achieve a desired flushing action. A sloping top wall 55 integrally interconnects the inner and outer peripheral sidewalls 51 and 52 and continues outwardly in a peripheral reinforcing flange 56. As shown, flange 56 is approximately twice as thick as the walls 51-55, as a result of the blow molding operation. As will be more fully explained below, flange 56 is formed by collapsing or pinching two parison wall portions together, resulting in a fused double-wall thickness. Most preferably, the flange flares outwardly along lines 57 and 58, as shown in FIG. 3, to blend into the minor sidewalls of the tank.

Figure 4:
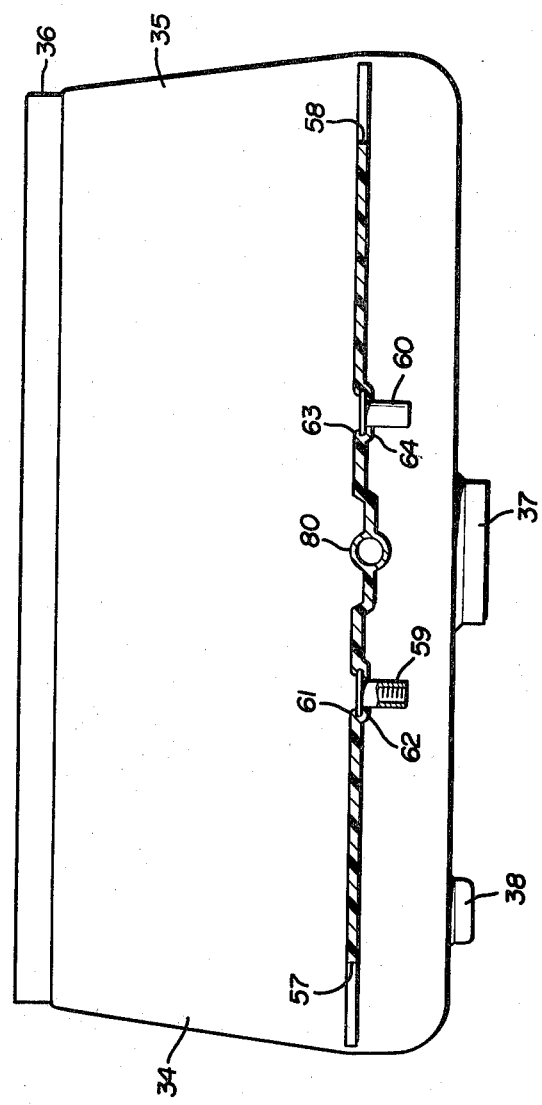
FIG. 4 is a cross-section view taken along plane 4—4, as shown in FIG. 3, illustrating the water passageway between the tank and rim flush and also illustrating the reinforcing web of plastic material.
Figure 5:
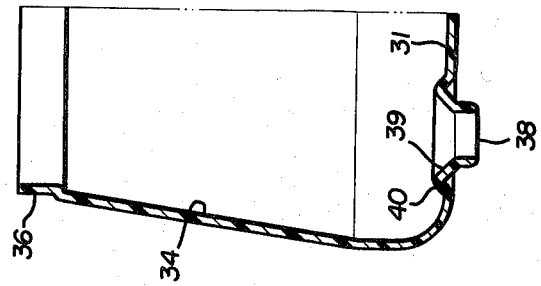
FIG. 5 is a cross-section view along plane 5—5 as shown in FIG. 3, illustrating that portion of the tank which includes a ball cock adapter flange.

Integral inserts 59 and 60 may optionally be integrally encased in the plastic material of the reinforcing web, as shown in FIG. 4. Such inserts may be of conventional design, including a threaded tubular portion and a top flange which is sandwiched between opposed annular beads of plastic material 61, 62 and 63, 64. In the molding operation, the inserts 59 and 60 may be set in depressions within the mold and then molded in place as the mold sections are closed on a tubular parison of the material. The beads of materials 61, 62 and 63, 64 may be formed by suitable inclined surfaces on the mold which force the plastic material around the insert flanges.

In the most preferred embodiment, the bottom floor 53 of the rim slopes gradually downwardly from the back portion of the rim, i.e. that portion of the rim closest to the tank, to the front of the rim. This gradual sloping may be on the order of, for example, two-tenths of an inch overall from front to back and facilitates the flow of water from the tank to distribute water to all of the plurality of openings 54.

Figure 3:
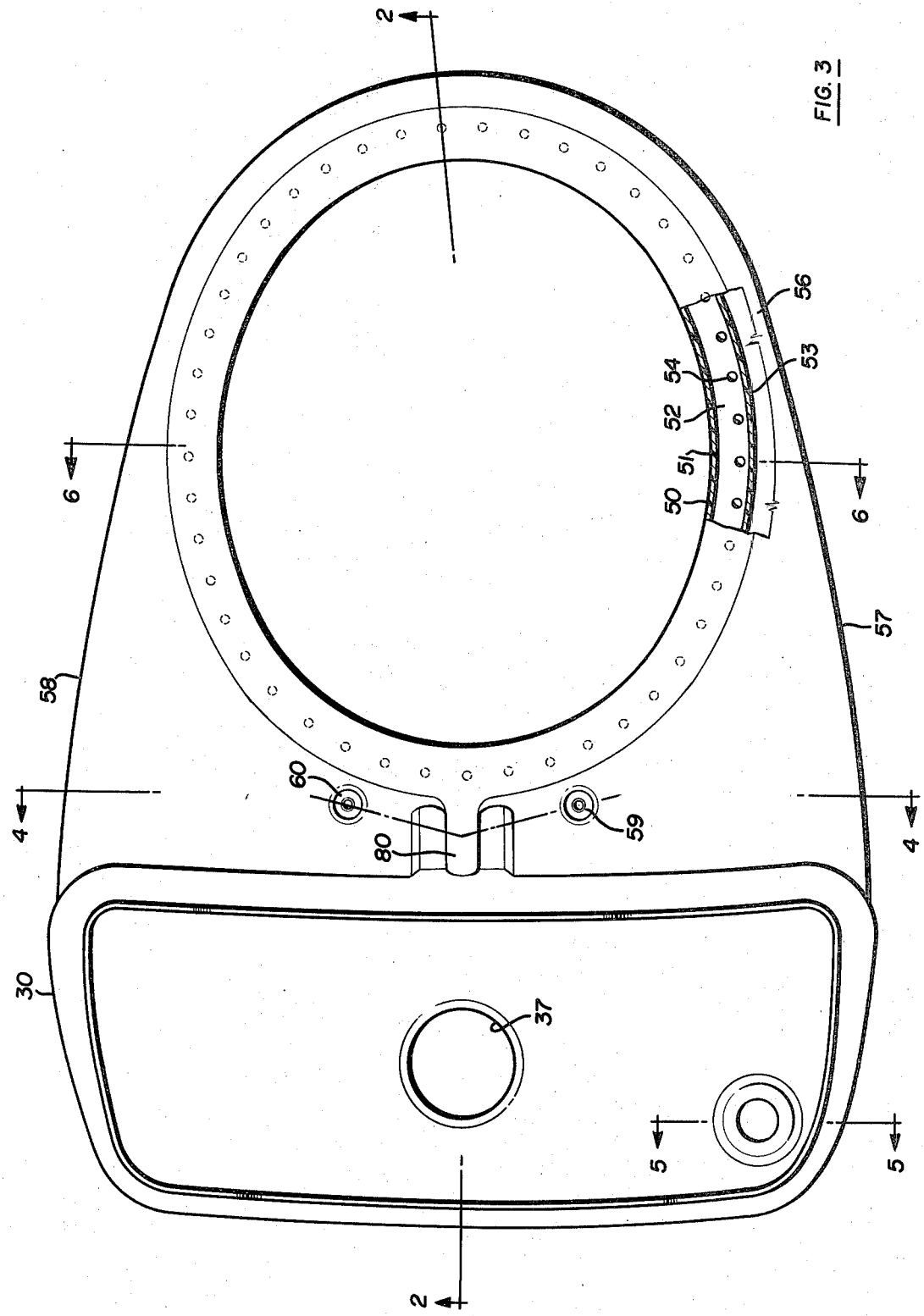
FIG. 3 is a top plan view of the invention, including a breakaway in the region of the rim.

As best shown in FIGS. 2, 3, and 4, the water passageway 80 is integrally interconnected between the tank 30 and the rim flush 50. This member is essentially tubular and may include a threaded interior surface 81 to receive a fitting (not shown) which is connected to a rim fill line attached to a ballcock.

In operation, tank 30 is filled with water by a ballcock mounted within flange 38. A flapper type valve assembly (not shown) seats within flange 37 and normally blocks the flow of water to a waterway of a bowl assembly. A suitable lever (also not shown) may extend through the front wall 33 of the tank to protrude through the shell housing. For flushing, the lever is triggered and raises a flapper valve to allow discharge of water from the tank through flange opening 37 and to activate the ballcock to supply water through an appropriate fill line to the water passageway 80. Water entering the rim flush 50 flows around the entire oval-shaped interior and is discharged through the openings 54 into a bowl.

Figure 8:
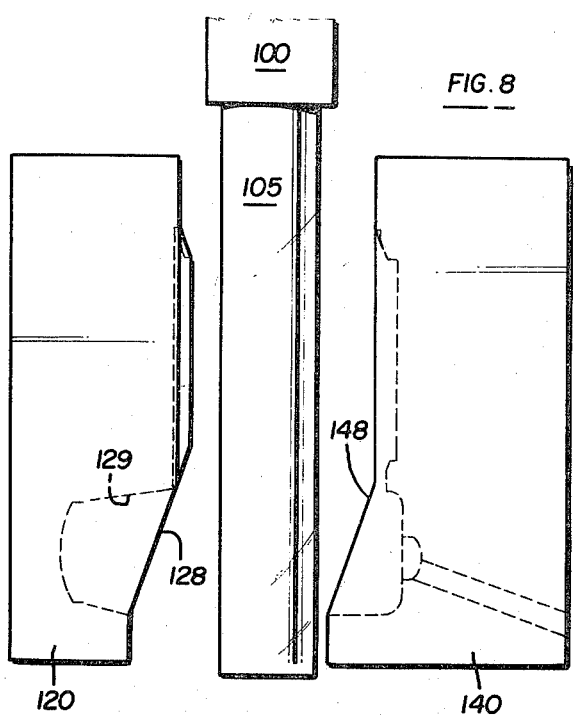
FIG. 8 is a side elevation of the molding operation, illustrating an extruded parison between the opened sections of the blow mold.
Figure 9:
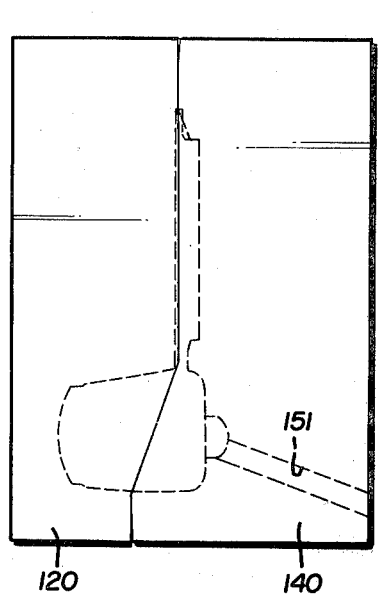
FIG. 9 illustrates the mold sections closed.

In the method of forming the integral, unitary plastic tank and rim flush, an elongated tubular parison 105 is downwardly extruded from an extruder die head 100 into a position between opened mold sections 120 and 140. During this extrusion, the upper portion of the elongated parison becomes thinner than the lower portions due to the weight of the parison and due to the fact that the upper parison portion is hotter by virtue of having been most recently extruded. When the parison reaches approximately the length shown in FIG. 8, the mold sections 120 and 140 are closed and then blow fluid under pressure is injected into the interior of the mold-enclosed parison.

Figure 10:
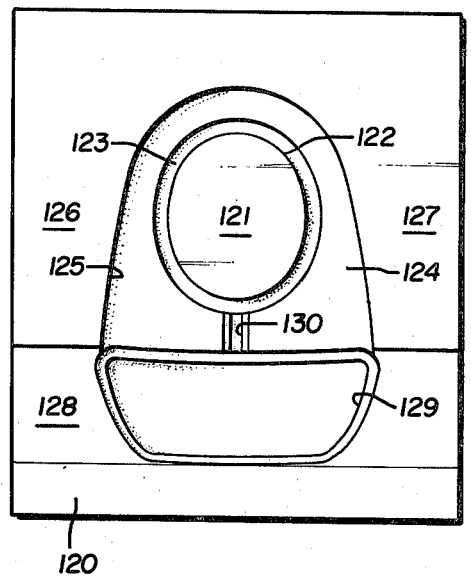
FIGS. 10 and 11 illustrate the mold configurations.
Figure 11:
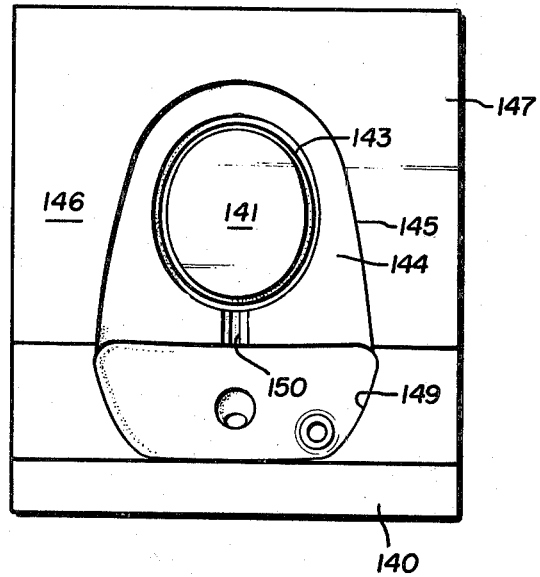

FIG. 10 illustrates that mold section 120 includes a central oval-shaped raised region 121 which is circumscribed by an oval trim line 122 to blank out an opening in the product. An oval-shaped depression or cavity 123 surrounds the pinch line 122 and corresponds to the configuration of top wall portion 55 of the rim. A secondary depressed region 124 corresponds in shape to the configuration of reinforcing flange 56 and is surrounded by a pinch line 125. Relief regions 126 and 127 are provided on each opposed side of the pinch line 125, in a conventional manner.

An essentially planar inclined surface 128 slopes downwardly and away from the essentially planar section which includes the cavities associated with the rim. This inclined region primarily includes a tank cavity portion 129 and is provided to reduce the extent of expansion required for the parison to reach the remote corners of the tank cavities in both mold sections 120 and 140.

A semi-cylindrical cavity 130 extends between the rim depression 123 and the tank cavity 129 for forming approximately one-half of the water passageway 80 and for providing fluid communication between the two opposed cavity regions.

Mold section 140 similarly includes a central oval-shaped raised region 141 circumscribed by a pinch line 142 for blanking out an opening in the product. An oval-shaped depression 143 corresponds to the configuration of the bottom wall portion of the rim, as best shown in FIG. 7. A flange forming depression 144 is surrounded by a pinch line 145, with relief regions 146 and 147 lying on opposed sides of the pinch line.

An outwardly extending inclined planar region 148 is parallel to mating mold surface 128 and includes a tank cavity portion 149 corresponding in shape and configuration to the bottom of tank 30, as collectively illustrated in FIGS. 2, 4, 5, and 6.

A semi-cylindrical cavity 150 forms the bottom half of water passageway 80 and interconnects the tank cavity 149 with rim depression 143.

In the blow molding operation, the thicker parison portion is enclosed within a tank cavity collectively defined by mold sub-cavities 129 and 149. In similar fashion, the top thinner parison portion is enclosed within the rim cavity, with the intermediate parison portion being enclosed within the water passageway cavity defined by mating semi-cylindrical sub-cavities 130 and 150.

As the mold sections are closed, the parison is pinched shut along pinch lines 125,145, is pinched shut along the pinch lines in the tank region, is pinched shut along pinch lines 122,142 and is fused together in the region of the reinforcing flange 56 to form a double thickness web. Although not shown, a blow pin may be received in opening 151 of mold section 140 for insertion into a portion of the parison within cavity 149. Blow fluid under pressure is introduced into that portion of the parison within the tank cavity, and at least a portion of the blow fluid flows through the cylindrical water passageway portion of the parison into that portion of the parison which is destined to form the rim. As a result, the thicker parison portion is expanded to the shape of the tank and the thinner parison portions are less drastically expanded to form the rim and water passageway.

Figure 12:
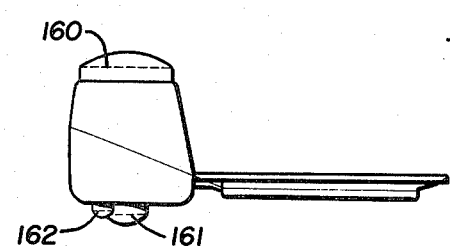
FIG. 12 illustrates the tank and rim as it appears after removal from the blow molds, but prior to any trimming operations.

After the blown article has cooled sufficiently within the mold cavities, it is removed from the mold and appears as shown in FIG. 12. The product is then trimmed along respective dashed lines 160, 161, and 162 to respectively trim the terminal ends of the tank, the water passageway flange, and the ballcock flange. Finally, the bottom wall 53 of the rim is drilled to form the plurality of openings 54. Other trimming operations might be provided to cut out an opening to receive a flush lever or flush button or other hardware.

Although not shown, the mold sections 120 and 140 may include appropriately shaped depressions to receive the inserts 59 and 60. This and other various modifications may be made to the disclosure without departing from the overall invention, since the disclosure is presented as exemplary rather than limiting.

Having therefore completely and sufficiently disclosed our invention, we now claim:

1. In a method of forming an integral, unitary toilet tank and rim flush which is free of any joints, the steps of:
   downwardly extruding an essentially tubular elongated parison of thermoplastic material, the parison being thinner at the top due to the weight of the parison and due to that portion of the parison being hotter as a result of its being extruded last;
   positioning the tubular thermoplastic parison between the opened sections of a blow mold, each of said sections including (a) a first, generally planar surface having a central, generally oval-shaped raised region circumscribed by a pinch line for blanking out an opening in the blown part and a depression circumscribing the pinch line for forming a rim flush and (b) an essentially planar inclined portion sloping away from the first planar surface, including a cavity for forming a portion of the tank, opposed inclined minor pinch lines blending into a pinch line which is essentially parallel with the plane of the first mold surface, and an essentially semi-cylindrical indent extending between the tank cavity and the depression in the first surface;
   closing the blow mold sections and thereby: (a) enclosing the thicker, bottom parison portion within a tank cavity formed by the respective partial tank cavities of the mold sections, (b) pinching the parison shut along essentially concentric oval-lines and enclosing the top parison portion within an annular mold rim cavity, and (c) enclosing the intermediate parison portion within an essentially cylindrical cavity interposed between the rim cavity and the tank cavity; and
   introducing blow air under pressure into the interior of the parison portion within the tank cavity, and flowing a portion of the blow air through a restricted parison portion in the cylindrical cavity and then to the parison portion in the rim cavity to expand the thicker parison portion into contact with the tank cavity walls, to force the intermediate parison portion against the cylindrical cavity and to expand the thinner parison portion into contact with the rim cavity walls, with said thicker portion of the parison within the tank cavity being stretched and expanded to a greater extent than the other portions of the parison.

2. The method as defined in claim 1, further including the steps of forming a top on the tank during the blowing operation and forming a pair of projections on a bottom of the tank by expanding plastic material into respective projection cavities; removing the blown part from the molds; trimming the top off the tank, trimming the terminal ends off the pair of projections; and forming holes in the bottom of the rim.

3. The method as defined in claim 2, including the additional step of threading a portion of the passageway.

4. The product formed by the method as defined in claim 1.

* * * * *